United States Patent
Fu (10) Patent No.: US 12,538,143 B1
(45) Date of Patent: Jan. 27, 2026

(54) METHOD FOR COMMUNICATION AND ACCESS POINT

(71) Applicant: TP-Link Systems Inc., Irvine, CA (US)

(72) Inventor: Qingwei Fu, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/092,903

(22) Filed: Mar. 27, 2025

(51) Int. Cl.
 *H04W 24/02* (2009.01)
 *H04B 7/06* (2006.01)
 *H04W 88/08* (2009.01)

(52) U.S. Cl.
 CPC .......... *H04W 24/02* (2013.01); *H04B 7/0608* (2013.01); *H04W 88/08* (2013.01)

(58) Field of Classification Search
 None
 See application file for complete search history.

(56) References Cited

U.S. PATENT DOCUMENTS

| | | | | |
|---|---|---|---|---|
| 2006/0276227 | A1* | 12/2006 | Dravida | H04W 88/085 455/562.1 |
| 2007/0254717 | A1* | 11/2007 | Yahagi | H04B 17/27 455/562.1 |
| 2012/0134279 | A1* | 5/2012 | Tamaki | H04B 7/0452 370/248 |
| 2012/0208581 | A1* | 8/2012 | Ishida | H04B 7/0691 455/562.1 |
| 2013/0142033 | A1* | 6/2013 | Zhang | H04L 1/1867 370/216 |
| 2016/0021575 | A1* | 1/2016 | Dziyauddin | H04W 52/267 370/311 |
| 2019/0181942 | A1* | 6/2019 | Tang | H04L 5/0057 |
| 2019/0306723 | A1* | 10/2019 | Hmimy | H04W 16/10 |
| 2021/0337401 | A1* | 10/2021 | Birr | H04W 24/02 |

FOREIGN PATENT DOCUMENTS

| | | | |
|---|---|---|---|
| CN | 101902264 A | 12/2010 | |
| CN | 102195692 A | 9/2011 | |
| CN | 114244409 A | 3/2022 | |
| CN | 117412340 A | 1/2024 | |
| WO | WO-2017069510 A1 * | 4/2017 | ............... H04B 7/04 |

OTHER PUBLICATIONS

Ji Yujie, "The Research on Antenna Selection Algorithm Selection and Power Allocaiton Algorithm of the MIMO Channel Capacity", Feb. 2013.

* cited by examiner

*Primary Examiner* — Faruk Hamza
*Assistant Examiner* — Cassandra L Decker
(74) *Attorney, Agent, or Firm* — Loeb & Loeb LLP (57) ABSTRACT

The present disclosure provides a method, an AP and a non-transitory computer readable medium. A method for communication performed by the AP, the method includes: determining whether to perform a communication optimization process based on the communication performance of the AP; in response to determining to perform the communication optimization process, dividing AP antennas of the AP into a first number of AP antenna groups based on a first grouping standard set, wherein the first number is less than a the number of the AP antennas of the AP; and selecting target AP antennas for communication, wherein no more than one target AP antenna is selected in each AP antenna group as target AP antennas, and using the target AP antennas for communication.

19 Claims, 5 Drawing Sheets

METHOD FOR COMMUNICATION AND ACCESS POINT

TECHNICAL FIELD

The present disclosure relates to wireless communication, and more specifically, to a method for communication and an access point (AP) performing the method.

BACKGROUND

In a wireless network such as a Wireless Local Area Network (WLAN), an AP communicates with client devices, also referred to as stations (STA), that are Wi-Fi compatible. In wireless communication, multiple-input multiple-output (MIMO) devices are becoming more and more popular, and the spatial stream (SS) supported by MIMO is increasing recently. For example, MIMO has increased from 2SS (802.11n) to 8SS (802.11ax). At the same time, the modulation scheme supported by AP is increasing from generation to generation, and the requirements for communication signal-to-noise ratio and channel information are also increasing from generation to generation. For example, in 802.11be, the highest modulation scheme is 4096 QAM, and the requirements for signal-to-noise ratio are 3 dB higher than the highest modulation scheme of 802.11ax which is 1024 QAM. In the consumer-grade AP, due to the size of the housing, the AP antenna layout in the AP must be compact. There may be potential mutual interference between AP antennas, which will lead to the deterioration of signal-to-noise ratio and throughput of communication and eventually lead to MIMO performance regression.

For example, in a 4×2 MIMO communication system between a pair of access point (AP) devices supporting 802.11be and equipped with four antennas and a station (STA) device with two antennas, when the layout of the four AP antennas in the AP is compact, the coherence between adjacent antennas may be very strong, and radio frequency signals may easily generate non-set coherent superposition at the STA end, which will lead to MIMO performance regression. It can be seen that the increase of AP antenna used by AP in communication cannot only produce positive gain but also negative gain for MIMO performance.

That is, with the increase of the number of AP antennas and the limit on the size of the housing of AP, there is a need for AP antenna scheduling, selection or configuration for AP.

SUMMARY

In view of the above problems, the present disclosure provides a method for selecting the AP antennas that an AP uses to communicate with one or more STA and an AP performing the method.

According to an aspect of the present disclosure, there is provided a method for communication performed by an access point (AP), including: determining whether to perform a communication optimization process based on the communication performance of the AP; in response to determining to perform the communication optimization process, dividing AP antennas of the AP into a first number of AP antenna groups based on a first grouping standard set, wherein the first number is less than a the number of the AP antennas of the AP; and selecting target AP antennas for communication, wherein no more than one target AP antenna is selected in each AP antenna group as target AP antennas.

In some embodiments, wherein the first grouping standard set is selected from a grouping standard based on the physical location of the AP antennas, a grouping standard based on the radiation pattern of the AP antennas, and a grouping standard based on the polarization direction of the AP antennas.

In some embodiments, wherein the communication performance includes a throughput, and determining whether to perform the communication optimization process includes: recording the throughput of communication by the AP during a predetermined time period before determining whether to perform the communication optimization process, comparing the recorded throughput of the AP with a predetermined throughput, in response to the recorded throughput of the AP is lower than the predetermined throughput, determining to perform the communication optimization process.

In some embodiments, wherein the recorded throughput of the AP has the same number of space-time streams and the same signal-to-noise ratio (SNR) as the predetermined throughput.

In some embodiments, wherein determining whether to perform the communication optimization process includes: in response to determining that the number of AP antennas is not greater than the number of antennas of STA, determining not to perform the communication optimization process.

In some embodiments, wherein the grouping standard based on the physical location of the AP antennas includes: dividing the AP antennas of which distance between physical locations is less than a first threshold distance into a same group.

In some embodiments, wherein the grouping standard based on the polarization direction of the AP antennas includes: dividing the AP antennas with a same polarization direction into a same group.

In some embodiments, wherein the grouping standard based on the radiation pattern of the AP antennas includes: dividing the AP antennas of which the similarity of radiation pattern is greater than the similarity threshold into a same group.

In some embodiments, wherein dividing the AP antennas into a first number of AP antenna groups based on a first grouping standard set includes: selecting a first order from a plurality of orders of grouping standards in the first grouping standard set, applying grouping standards in the first grouping standard set in the first order to divide AP antennas into the first number of AP antenna groups.

In some embodiments, wherein selecting no more than one AP antenna in each AP antenna group as target AP antennas includes: determining the average received signal strength indication RSSI of the AP antennas, comparing the RSSI of AP antennas in each AP antenna group with the average RSSI, selecting the AP antennas with the RSSI with a largest deviation from the average RSSI from each AP antenna group for communication.

In some embodiments, the method further including: performing inter-group selection on the AP antennas selected in each AP antenna group, using the AP antennas inter-group selected as the target AP antennas for communication, wherein, the inter-group selection includes selecting AP antennas of which distance between physical locations is more than a second distance threshold from AP antennas selected in each AP antenna group.

In some embodiments, the method further including: recording the throughput of the AP using the target AP antenna for communication for a predetermined period of time, comparing the recorded throughput of the target AP antennas with a predetermined throughput, in response to the recorded throughput of the target AP antennas being lower than the predetermined throughput, determining to perform the communication optimization process again, wherein the recorded throughput of the target AP antennas has the same number of space-time streams and the same signal-to-noise ratio (SNR) as the predetermined throughput.

In some embodiments, wherein performing the communication optimization process again includes: dividing AP antennas into a second number of AP antenna groups based on a second grouping standard set, wherein the second number is not less than the number of STA antennas of the STA and is less than the number of the AP antennas; and selecting no more than one antenna in each AP antenna group as the target AP antennas.

In some embodiments, wherein, the first number is different from the second number; the grouping standards included in the first grouping standard set are different from the grouping standards included in the second grouping standard set; or the grouping standards included in the first grouping standard set are same as the grouping standards included in the second grouping standard set, and the order in which the grouping standards in the first grouping standard set are applied is different from the order in which the grouping standards in the second grouping standard set are applied.

In some embodiments, the method further including: stopping antenna selection in response to at least one of: the number of performing antenna selection more than a predetermined number, RSSI change of AP antennas being greater than a predetermined RSSI, and SNR change of AP antennas being greater than a predetermined SNR, wherein the predetermined number is determined based on the number of AP antennas and the number of STA antennas of the STA, using the AP antennas with the highest throughput during antenna selection for communication.

In some embodiments, the method further including: in response to determining that the recorded throughput of the AP being not lower than a predetermined throughput, using the target antenna for communication.

In some embodiments, the method further including: determining whether to perform the communication optimization process again in response to the RSSI change of the AP antenna being greater than the predetermined RSSI or SNR change of AP antennas being greater than the predetermined SNR during communication using the target antenna.

In some embodiments, further including: before determining whether to perform the communication optimization process, using all the AP antennas to communicate with the STA, in response to determining not to perform the communication optimization process, keeping using all the AP antennas for communication.

In some embodiments, wherein the first number is not less than the number of STA antennas of a station (STA) communicating with the AP and the number of the target AP antennas is not less than the number of the STA antennas of the STA.

According to an aspect of the present disclosure, there is provided an access point (AP), the AP including: a memory; and a processor coupled to the memory and configured to: determine whether to perform a communication optimization process based on the communication performance of the AP; in response to determining to perform the communication optimization process, divide AP antennas of the AP into a first number of AP antenna groups based on a first grouping standard set, wherein the first number is less than the number of the AP antennas of the AP; and select target AP antennas for communication, wherein no more than one target AP antenna is selected in each AP antenna group.

According to an aspect of the present disclosure, there is provided a non-transitory computer readable medium on which stores instructions, when performed by a processor, the instructions cause the processor to: determine whether to perform a communication optimization process based on the communication performance of the AP; in response to determining to perform the communication optimization process, divide AP antennas of the AP into a first number of AP antenna groups based on a first grouping standard set, wherein the first number is less than the number of the AP antennas of the AP; and select target AP antennas for communication, wherein no more than one target AP antenna is selected in each AP antenna group.

At least based on the above embodiments of the present disclosure, an improved mechanism for selecting the AP antennas that the AP uses to communicate with the STA may be realized while reducing the time cost of selecting the AP antennas.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

Some of the drawings may not depict all the components of a given method, device and system. Like reference numerals may be used to denote like features throughout the specification and drawings.

Figure 1:
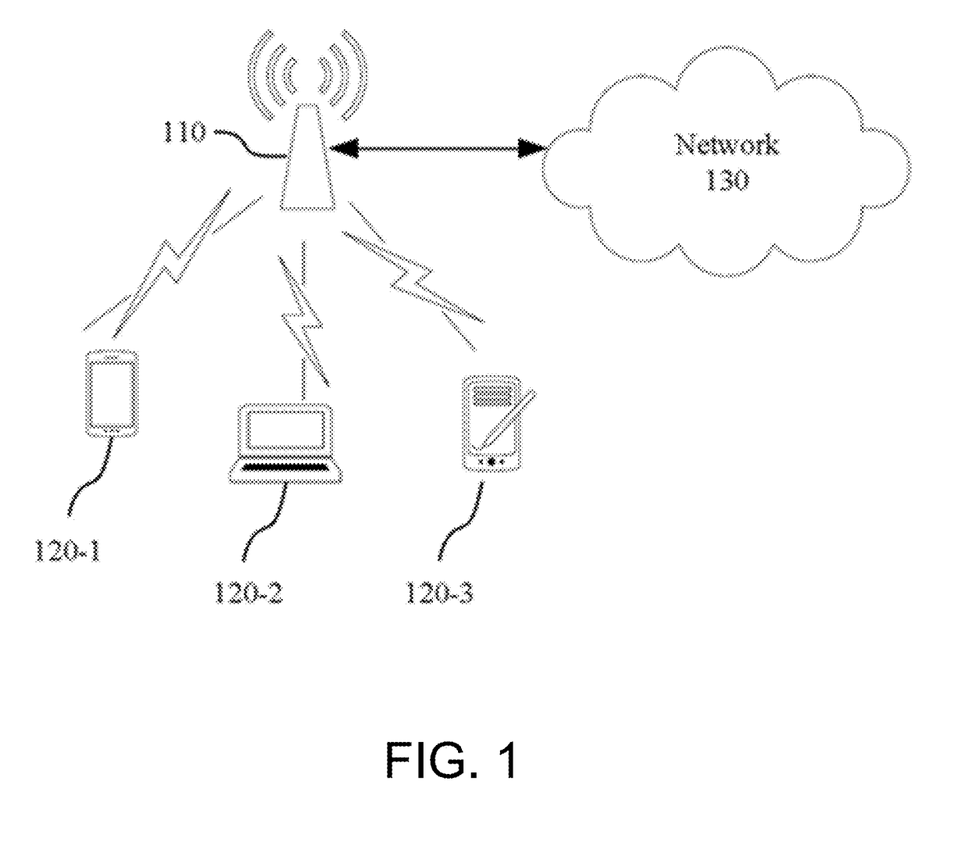
FIG. 1 is a schematic diagram illustrating an exemplary application scenario according to an embodiment of the present disclosure.

FIG. 1 is a schematic diagram illustrating an exemplary application scenario according to an embodiment of the present disclosure.

Referring to FIG. 1, AP 110 may communicate wirelessly with the stations (STAs) 120-1 through 120-3 over a wireless channel and using one or more Wi-Fi protocols. The STAs 120-1, 120-2 and 120-3 have wireless connections with AP 110. The AP 110 may be configured with one or more AP antennas, and the STAs 120-1, 120-2 and 120-3 may be configured with one or more STA antennas, respectively. The STAs 120-1, 120-2 and 120-3 may be mobile phones, wearable communication devices, laptop computers, desktop computers, tablet computers, personal Digital Assistant (PDA), or the like. AP 110 may access network 103 via a wired channel such as a fiber. The network 103 may include various networks, such as wide area work (WAN), local area network (LAN), metropolitan area network, peer-to-peer, and the like. AP 110 thereby provides network access to the STAs 120-1, 120-2 and 120-3.

Figure 2:
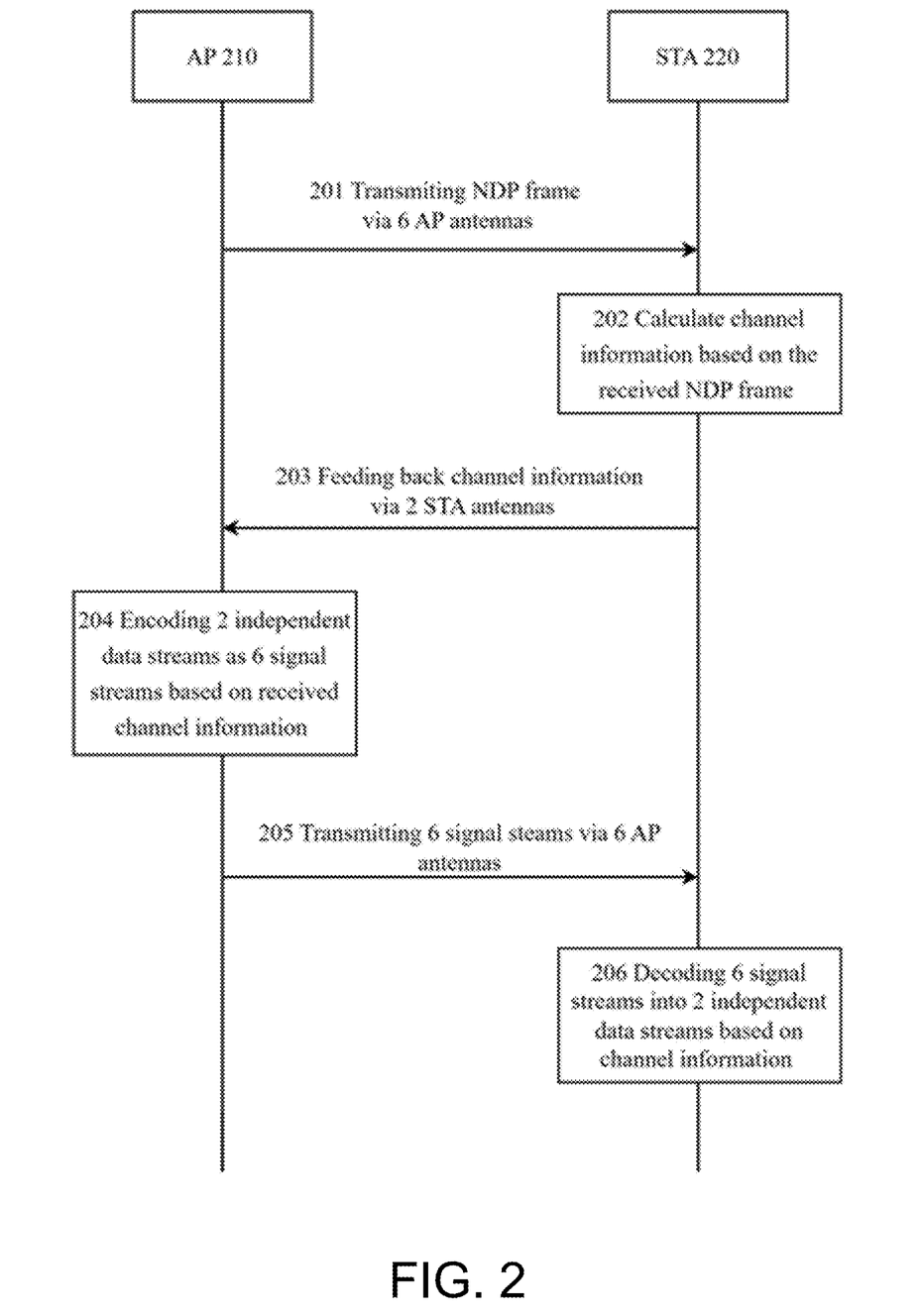
FIG. 2 is a schematic diagram illustrating an exemplary communication procedure between AP 210 and STA 220.

FIG. 2 is a schematic diagram illustrating an exemplary communication procedure between AP 210 and STA 220.

The AP 210 may be similar to the AP 110 described in FIG. 1, and the STA 220 may be similar to the STAs 120-1, 120-2 and 120-3 described in FIG. 1. The AP 210 may be configured with 6 AP antennas, and the STA 220 may be configured with 2 STA antennas.

At operation 201, when the AP 210 starts the communication with the STA 220, the AP 210 may transmit Null Data Packet (NDP) frame via all the 6 AP antennas with which the AP 210 configured to STA 220. The NDP may be used for channel detection during beamforming. Specifically, the NDP frame itself does not carry any data, but contains a pilot signal for computing channel information. The STA receiving the NDP frame may estimate the channel information based on the signal included in the NDP frame, thereby helping to optimize the signal transmission quality in multi-antenna system.

At operation 202, the STA 220 may receive the NDP frame and compute the channel information based on the received NDP. According to an embodiment of the present disclosure, the STA 220 may compute the channel information as a matrix with a dimension of [6×2]. The number of rows of matrix is dependent on the number of AP antennas used of AP 210, and the number of columns of matrix is dependent on the number of STA antennas used of STA 220.

At operation 203, the STA 220 may feed back the channel information via 2 STA antennas to the AP 210.

At operation 204, the AP 210 may receive the channel information and encode 2 independent data streams as 6 signal streams based on received channel information in matrix form.

At operation 205, the AP 210 may communicate with the STA 220 by transmitting 6 signal steams via 6 AP antennas to the STA 220.

At operation 206, the STA 220 may receive the 6 signal steams and decode 6 signal streams into 2 independent data streams based on the channel information.

However, the layout of the 6 AP antennas in the AP 210 may be compact and the coherence between adjacent AP antennas may be very strong, and radio frequency signals may easily generate non-set coherent superposition at the STA 220, which will lead to MIMO performance regression. In addition, during the procedure of establishing the communication between the AP 210 and STA 220, the channel information is computed as the matrix with the dimension of [6×2] for which the computing complicity is very high.

Figure 3:
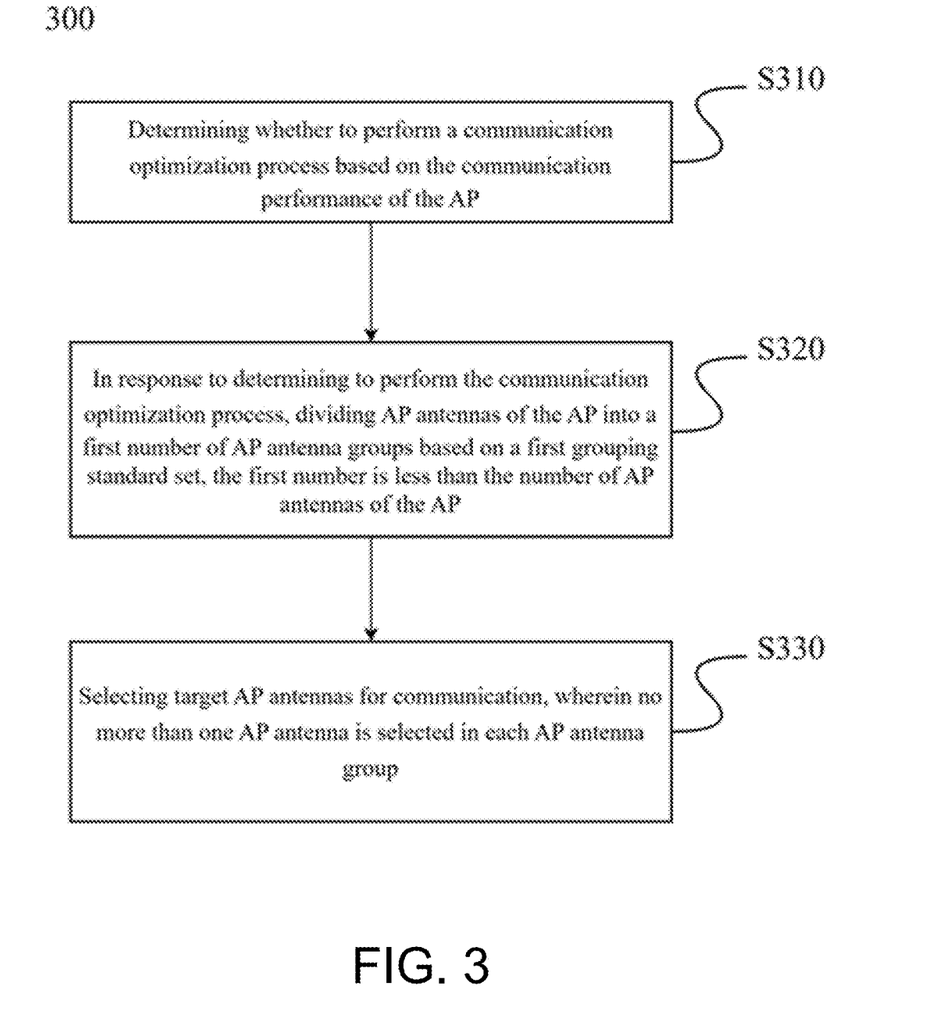
FIG. 3 is a schematic flowchart illustrating method 300 for communication by an AP according to one embodiment of the present disclosure.

FIG. 3 is a schematic flowchart illustrating method 300 for communication by an AP according to one embodiment of the present disclosure. Method 300 may be implemented by AP 110 in FIG. 1 and AP 210 in FIG. 2. Referring to FIG. 3, method 300 may include steps S310~S330.

At step S310, the AP may determine whether to perform a communication optimization process based on the communication performance of the AP. According to an embodiment of the present disclosure, the AP may record the communication performance of the currently used AP antennas of AP for a period of time, and compare the recorded communication performance with the predetermined communication performance. If the recorded communication performance is worse than the predetermined communication performance, the AP may perform a communication optimization process to optimize the communication between the AP and the STA.

At step S320, in response to determining to perform the communication optimization process, the AP may divide the AP antennas of the AP into a first number of AP antenna groups based on a first grouping standard set. The first grouping standard set may include one or more grouping standard. The AP antennas may be divided into different groups based on different grouping standard. In one embodiment, the first number may be not less than the number of STA antennas of the STA communicating with the AP. In another embodiment, the first number may be less than the number of AP antennas of the AP. According to an embodiment of the present disclosure, the AP may be configured with 6 AP antennas, and the STA may be configured with 2 STA antennas. Thus, the first number of the AP antenna groups may be less than 6 and not less than 2. Those skilled in the art should understand the number of AP antennas and the number of STA antennas are only example instead of limitation, the number of AP antennas and the number of STA antennas may be more or less.

At step S330, the AP may select target AP antennas for communication, wherein no more than one AP antenna is selected in each AP antenna group. According to an embodiment of the present disclosure, one AP antenna may be selected in one AP antenna group. According to another embodiment, no AP antenna may be selected in another AP antenna group. In one embodiment, the number of the target AP antennas is not less than the number of the STA antennas of the STA. For example, the number of target AP antennas may be not less than 2 which is the number of STA antennas that the STA configured. The AP may also map the spatial-time streams to the selected AP antennas. However, in the case that the STA does not use all the STA antennas for communication, for example data transmission, the number of target AP antennas may be less than the number of STA antennas.

According to the embodiment of the present disclosure, even if the layout of the 6 AP antennas in the AP is compact, but target AP antennas selected will have weak coherence, and radio frequency signals may hardly generate non-set coherent superposition at the STA. In addition, during the procedure of establishing the communication between the AP and STA, the dimension of the matrix of the channel information will be reduced since the AP antennas used is reduced. Thus, the computing complexity of the channel information is very low. In this way, the communication performance in multiple-antennas system may be optimized.

Figure 4:
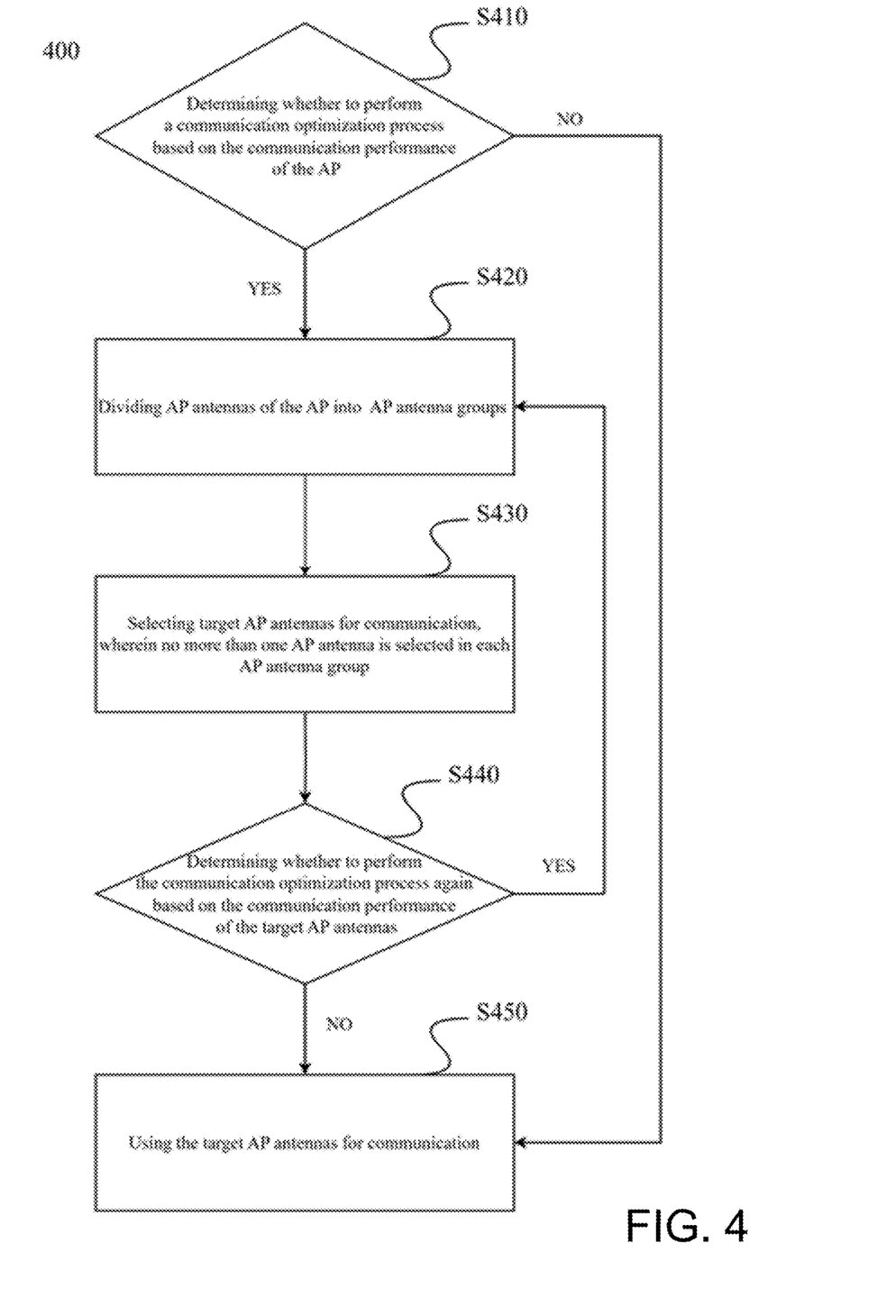
FIG. 4 is a schematic flowchart illustrating method 400 for communication by an AP according to one embodiment of the present disclosure.

FIG. 4 is a schematic flowchart illustrating method 400 for communication by an AP according to one embodiment of the present disclosure. Method 400 may be implemented by AP 110 in FIG. 1 and AP 210 in FIG. 2. Referring to FIG. 4, method 400 may include steps S410~S440.

At step S410, the AP may determine whether to perform a communication optimization process based on the communication performance of the AP. According to an embodiment of the present disclosure, the AP may record the communication performance of the currently used AP antennas of AP for a period of time, and compare the recorded communication performance with the predetermined communication performance. If the recorded communication performance is better than or same as the predetermined communication performance, the AP may not perform the communication optimization process, and the procedure may proceed to the step S440. At the step S440, the AP may use the currently used antennas as the target AP antennas for communication. If the recorded communication performance is worse than the predetermined communication performance, the AP may perform the communication optimization process to optimize the communication between the AP and the STA, and the procedure may proceed to the step S420.

According to an embodiment of the present disclosure, the current used AP antennas may be all the AP antennas that the AP is configured with. For example, before determining whether to perform the communication optimization process, the AP may use all the AP antennas to communicate with the STA, which is similar to the procedure described in the FIG. 2. In response to determining not to perform the communication optimization process, the AP may keep using all the AP antennas for communication at step S440.

According to an embodiment of the present disclosure, the communication performance may be throughput of the AP. For example, when determining whether to perform the communication optimization process, the AP may record the throughput of communication by the AP during a predetermined time period before determining whether to perform the communication optimization process. In one embodiment, the AP may directly record the throughput of communication by the AP. In another embodiment, the AP may apply different modulation schemes and test which modulation scheme is applied successfully. Different modulation schemes may correspond to different throughput. In addition, the AP may also record the number of space-time streams and the signal-to-noise ratio (SNR) corresponding to the recorded throughput.

The AP may be configured with one or more predetermined throughput. The one or more predetermined throughput may correspond to different number of space-time streams and SNR. The one or more predetermined throughput represents the minimum allowable throughput in certain number of space-time streams and SNR. The one or more predetermined throughput may be determined by communication standards (for example, IEEE 802.11) or the manufacturer of the AP.

The AP may compare the recorded throughput of the AP with the predetermined throughput. To make the comparison more accurate, the recorded throughput of the AP may have the same number of space-time streams and the same signal-to-noise ratio (SNR) as the predetermined throughput. In response to determining that the recorded throughput of the AP is lower than the predetermined throughput, the AP may determine to perform the communication optimization process. In response to determining that the recorded throughput of the AP is not lower than the predetermined throughput, the AP may determine not to perform the communication optimization process.

By the step S410, the communication optimization process is only performed in the case of the communication performance is deteriorated, thus the unnecessary optimization time overhead of AP is reduced and data throughput is improved.

At step S420, the AP may divide the AP antennas of the AP into AP antenna groups. As described above, the AP may divide the AP antennas into a first number of AP antenna groups based on a first grouping standard set. In one embodiment, the first number may be not less than the number of STA antennas of the STA communicating with the AP. In another embodiment, the first number may be less than the number of AP antennas. The first grouping standard set may include one or more grouping standard. For example, the first grouping standard set may be selected from a grouping standard based on the physical location of the AP antennas, a grouping standard based on the radiation pattern of the AP antennas, and a grouping standard based on the polarization direction of the AP antennas. That is, the first grouping standard set may include one or more of the grouping standard based on the physical location of the AP antennas, the grouping standard based on the radiation pattern of the AP antennas, and the grouping standard based on the polarization direction of the AP antennas.

Figure 5:
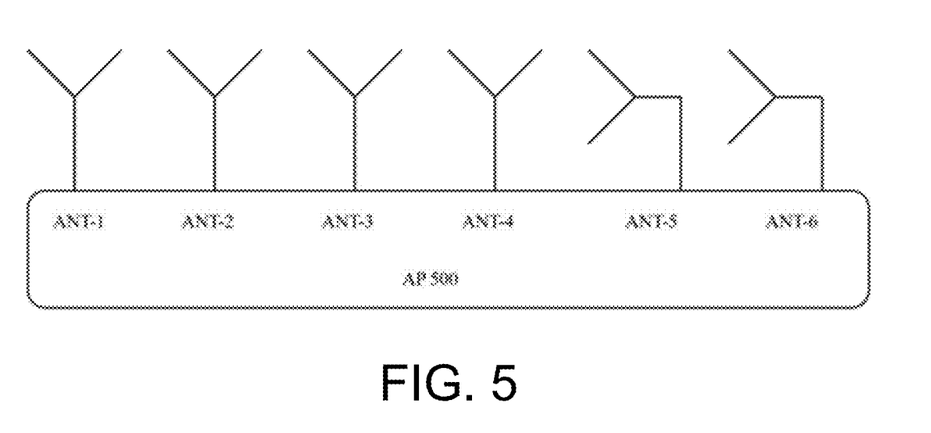
FIG. 5 is a schematic diagram illustrating antennas of an AP according to an embodiment of the present disclosure.

The above-mentioned various grouping standards for antennas will be described with reference to FIG. 5. FIG. 5 is a schematic diagram illustrating antennas of an AP according to an embodiment of the present disclosure. As shown in FIG. 5, the AP 500 is configured with 6 antennas including the ANT-1 to the ANT-6.

According to an embodiment of the present disclosure, the grouping standard based on the physical location of the AP antennas may include dividing the AP antennas of which distance between physical locations is less than a first threshold distance into a same AP antenna group. For example, the distance between the ANT-1 and the ANT-2, the distance between the ANT-3 and the ANT-4, the distance between the ANT-5 and the ANT-6 may be less than the first threshold distance, respectively. Thus, the ANT-1 and the ANT-2, the ANT-3 and the ANT-4, the ANT-5 and the ANT-6 may be grouped in three AP antenna groups, respectively. Those skilled in the art should understand, above grouping is only example, depending on the specific value of the first threshold distance, the ANT-1 to the ANT-6 may be grouped differently, for example, the ANT-1, the ANT-2, and the ANT-3 may be grouped in a AP antenna group, and the ANT-4, the ANT-5, and the ANT-6 may be grouped in another AP antenna group.

According to an embodiment of the present disclosure, the grouping standard based on the polarization direction of the AP antennas may include dividing the AP antennas with a same polarization direction into a same AP antenna group. As shown in FIG. 5, the ANT-1 to the ANT-4 are horizontal polarization antennas, and the ANT-5 to the ANT-6 are vertical polarization antennas. Thus, the ANT-1 to the ANT-4 may be grouped in a AP antenna group, and the ANT-5 to the ANT-6 may be grouped in a AP antenna group. Those skilled in the art should understand, the number of horizontally polarized antennas and the number of vertically polarized antennas are only example, depending on the specific configuration of AP 500, there may be more or less horizontally polarized antennas and more or less vertically polarized antennas. In addition, although the antennas are described to be grouped according to horizontal polarization and vertical polarization, those skilled in the art may understand that the antennas may also be grouped according to polarization directions such as tilted polarization, right-hand circular polarization, left-hand circular polarization, and elliptical polarization.

According to an embodiment of the present disclosure, the grouping standard based on the radiation pattern of the AP antennas may include dividing the AP antennas of which the similarity of radiation pattern is greater than the similarity threshold into a same AP antenna group. For example, the similarity of radiation pattern of the ANT-1, the ANT-5 and the ANT-6 may be greater than the similarity threshold, and the similarity of radiation pattern of the ANT-2, the ANT-3 and the ANT-4 may be greater than the similarity threshold. Thus, the ANT-1, the ANT-5 and the ANT-6 may be grouped in a AP antenna group and the ANT-2, the ANT-3 and the ANT-4 may be grouped in another AP antenna group. In one embodiment, the similarity of radiation pattern may be determined by maximum radiation direction of antennas. For example, if the differences of maximum radiation direction of two or more antennas are smaller than a predetermined threshold, the similarity of radiation pattern of the two or more antennas may be greater than the similarity threshold and the two or more antennas could be grouped in one AP antenna group. In another embodiment, the similarity of radiation pattern may be determined by main lobe width, side lobe level, side lobe structure of antennas, but the present disclosure is not limited thereto.

There may be one or more order to apply the grouping standards included in the first grouping standard set. According to an embodiment of the present disclosure, dividing the AP antennas into a first number of AP antenna groups based on a first grouping standard set may includes selecting a first order from a plurality of orders of grouping standards in the first grouping standard set and applying grouping standards in the first grouping standard set in the first order to divide AP antennas into the first number of AP antenna groups. Different orders to apply the grouping standards included in the first grouping standard set may result in different grouping results. For example, the first grouping standard set may include the grouping standard based on the physical location of the AP antennas and the grouping standard based on the radiation pattern of the AP antennas. The first order may be applying the grouping standard based on the physical location of the AP antennas firstly and applying the grouping standard based on the radiation pattern of the AP antennas secondly. By applying the grouping standard based on the physical location of the AP antennas firstly, the AP antennas may be divided into two AP antenna groups. One AP antenna group may include the ANT-1, the ANT-2 and the ANT-3 and the other AP antenna group may include the ANT-4, the ANT-5 and the ANT-6. By applying the grouping standard based on the radiation pattern of the AP antennas secondly, the AP antennas may be further divided into four AP antenna groups. The four AP antenna groups may include a first AP antenna group including the ANT-1, a second AP antenna group including the ANT-2 and the ANT-3, a third AP antenna group including the ANT-4 and a fourth AP antenna group including the ANT-5 and the ANT-6. The second order may be applying the grouping standard based on the radiation pattern of the AP antennas firstly and applying the grouping standard based on the physical location of the AP antennas secondly. By applying the grouping standard based on the radiation pattern of the AP antennas firstly, the AP antennas may be divided into two AP antenna groups. One AP antenna group may include the ANT-1, the ANT-5 and the ANT-6 and the other AP antenna group may include the ANT-2, the ANT-3 and the ANT-4. By applying the grouping standard based on the physical location of the AP antennas secondly, the AP antennas may not be further divided. Thus, there will be two AP antenna groups when the antennas are divided in the second order of the first grouping standard set.

The AP may select no more than one AP antenna in each AP antenna group as target AP antennas, and using the target AP antennas for communication. According to an embodiment of the present disclosure, one AP antenna may be selected in one AP antenna group. According to another embodiment of the present disclosure, no AP antenna may be selected in another AP antenna group. In one embodiment, the number of the target AP antennas is not less than the number of the STA antennas of the STA. For example, the number of target AP antennas may be not less than 2 which is the number of STA antennas that the STA configured. However, in the case that the STA does not use all the STA antennas for communication, for example data transmission, the number of target AP antennas may be less than the number of STA antennas.

At step S430, the AP may select no more than one AP antenna in each AP antenna group as target AP antennas, and using the target AP antennas for communication. In one embodiment, the number of the target AP antennas is not less than the number of the STA antennas of the STA. According to an embodiment of the present disclosure, the AP may determine the average received signal strength indication RSSI of the AP antennas. For example, before determining whether to perform the communication optimization process, the AP may use all the AP antennas to communicate with the STA, thus the AP may obtain RSSI of all the AP antennas. The AP may compare the RSSI of AP antennas in each AP antenna group with the average RSSI, and select the AP antennas with the RSSI with a largest deviation from the average RSSI from each AP antenna group for communication. However, in the case that the STA does not use all the STA antennas for communication, for example data transmission, the number of target AP antennas may be less than the number of STA antennas of the STA.

Additionally or alternatively, the AP may further perform inter-group selection on the AP antennas selected in each AP antenna group, and use the AP antennas inter-group selected as the target AP antennas for communication. When performing inter-group selection on the AP antennas, the AP may select AP antennas of which distance between physical locations is more than a second distance threshold among AP antennas selected in each AP antenna group. The first distance threshold and the second distance threshold may be same or not same. For example, the AP may select the ANT-1, the ANT-3, and the ANT-6 in each AP antenna group. The AP may further perform inter-group selection on the ANT-1, the ANT-3, and the ANT-6, so as to select the ANT-1 and the ANT-6 of which distance between physical locations is more than a second distance threshold. The AP may use the ANT-1 and the ANT-6 as target AP antennas for communication.

At step S440, the AP may determine whether to perform the communication optimization process again based on the communication performance of the target AP antennas. For example, the AP may use the target AP antennas for communication for a while. The AP may record the throughput of the AP using the target AP antenna for communication for a predetermined period of time. As described above, the AP may directly record the throughput of communication by the AP or the AP may apply different modulation schemes and test which modulation scheme is applied successfully to determine the throughput of communication by the AP. In addition, the AP may also record the number of space-time streams and the signal-to-noise ratio (SNR) corresponding to the recorded throughput. The AP may compare the recorded throughput of the target AP antennas with a predetermined throughput, wherein the recorded throughput of the target AP antennas has the same number of space-time streams and the same signal-to-noise ratio (SNR) as the predetermined throughput. In response to determining that the recorded throughput of the AP being not lower than a predetermined throughput, the procedure may proceed to the step S450, and the AP may use the target antenna for communication. In response to determining that the recorded throughput of the target AP antennas being lower than the predetermined throughput, the procedure may proceed to the step S420, the AP may determine to perform the communication optimization process again.

According to an embodiment of the present disclosure, when performing the communication optimization process again, the AP may divide the AP antennas into a second number of AP antenna groups based on a second grouping standard set at the step S420. In one embodiment, the second number is not less than the number of STA antennas of the STA and is less than the number of the AP antennas.

According to an embodiment of the present disclosure, in order to select different target AP antennas, one or more of the following conditions is satisfied: the first number may be different from the second number; the grouping standards included in the first grouping standard set may be different from the grouping standards included in the second grouping standard set; or the grouping standards included in the first grouping standard set may be same as the grouping standards included in the second grouping standard set, and the order in which the grouping standards in the first grouping standard set are applied is different from the order in which the grouping standards in the second grouping standard set are applied.

According to an embodiment of the present disclosure, when performing the communication optimization process again, the AP may select target AP antennas for communication, wherein no more than one target antenna is selected in each AP antenna group as the target AP antennas at step S430, and the number of the target AP antennas is not less than the number of the STA antennas of the STA. Additionally or alternatively, the AP may further perform inter-group selection on the AP antennas selected in each AP antenna group when performing the communication optimization process again.

At step S440, the AP may determine whether to perform the communication optimization process again based on the communication performance of the target AP antennas as described above. According to an embodiment of the present disclosure, the AP may stop antenna selection in response to the number of performing antenna selection more than a predetermined number. The predetermined number may be determined based on the number of AP antennas and the number of STA antennas of the STA.

In addition, if the STA communicating the AP move from its current location, further AP antennas selection based on the parameter (for example, the RSSI, SNR, and radiation pattern and so on of the AP antennas) of the current location will not be necessary. Thus, in response to the RSSI change of AP antennas being greater than a predetermined RSSI and/or SNR change of AP antennas being greater than a predetermined SNR, the AP may stop antenna selection.

According to an embodiment of the present disclosure, if the AP fails to find target AP antennas of which communication performance is better than or same as the predetermined communication performance and stops the antenna selection for the reasons that the number of performing antenna selection more than a predetermined number or the RSSI change of AP antennas being greater than a predetermined RSSI and/or SNR change of AP antennas being greater than a predetermined SNR, the AP may use the AP antennas with the highest throughput during antenna selection for communication. That is, in this case, the AP antennas with the highest throughput during antenna selection may be determined as target AP antennas.

The AP may use the target AP antennas for communication at the step S450 until the STA move again. That is, if the RSSI change of the AP antenna is greater than the predetermined RSSI or SNR change of AP antennas is greater than the predetermined SNR during communication using the target AP antennas, the AP may perform the method 400 again and determine whether to perform the communication optimization process.

Figure 6:
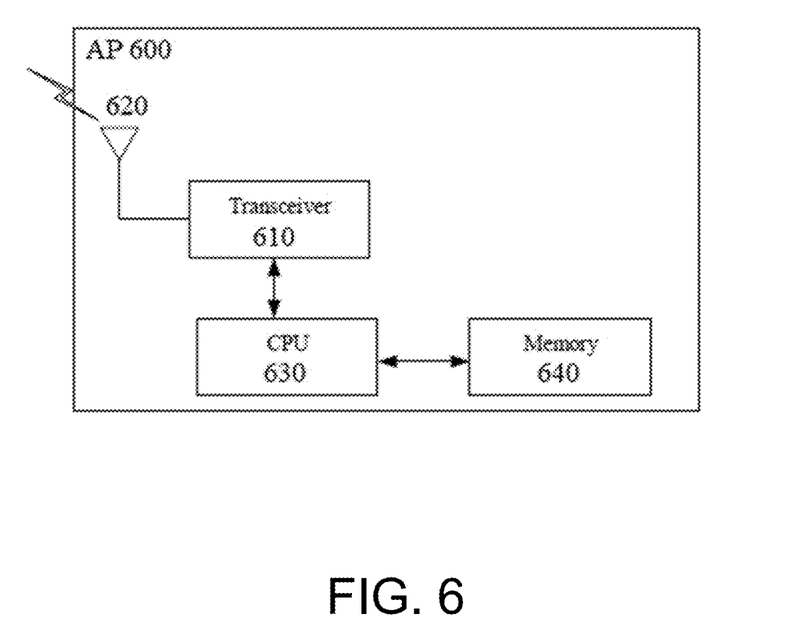
FIG. 6 is a schematic block diagram of an AP 600 according to one embodiment of the present disclosure

FIG. 6 is a schematic block diagram of an AP 600 according to one embodiment of the present disclosure. It should be noted that AP 600 depicted in FIG. 6 may correspond to AP 110 as described above and may be used to perform the operations of communication optimization process as described in the above with respect to method 300 and method 400.

FIG. 6 shows an example configuration of a AP 600 according to an embodiment of the present disclosure. The AP 600 may include a transceiver 610, at least one antenna 620 (for the sake of simplicity, only one antenna is shown in FIG. 6), a central processing unit (CPU) 630 and at least one memory 640. The transceiver 610 may be used to establish a link and transmit/receive signal over a channel of the link via the antenna 620. The transceiver 610 and the CPU 630 may function together as a circuit of the AP 600 configured to perform methods (e.g., method 300 and method 400) as described in the present disclosure. It should be understood that the configuration of the communication device shown in FIG. 6 is merely as example, but not a limitation. The configuration of the communication device in the present disclosure may comprise more or less components than those in FIG. 6 . . . .

In addition, according to another embodiment of the present disclosure, a computer program product for controlling the bandwidth of a channel including a plurality of subchannels is disclosed. As an example, the computer program product comprises a non-transitory computer readable storage medium having program instructions embodied therewith, and the program instructions are executable by a processor. When executed, the program instructions cause the processor to perform one or more of the procedures above described, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

An expression such as "according to", "based on", "depend on", and so on as used in the disclosure does not mean "according only to", "based only on", or "dependent only on", unless it is explicitly otherwise stated. In other words, such expression generally means "according at least to", "based at least on", or "depend at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

It should be noted that the above description is only some embodiments of the present disclosure and an illustration of the applied technical principles. It should be understood by those skilled in the art that the present disclosure scope involved in the present disclosure is not limited to the technical solutions resulting from specific combinations of the above technical features, but also encompasses other technical solutions resulting from any combination of the above technical features or their equivalents without departing from the above disclosed concept, for example, the technical solutions formed by replacing between the above features and the technical features with similar functions disclosed in the present disclosure (but not limited hereto).

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for communication performed by an access point (AP) comprising:

determining whether to perform a communication optimization process based on a communication performance of the AP;

in response to determining to perform the communication optimization process, dividing AP antennas of the AP into a first number of AP antenna groups based on a first grouping standard set, wherein the first number of the AP antenna groups is less than a number of the AP antennas of the AP; and selecting target AP antennas for communication, wherein no more than one target AP antenna is selected in each AP antenna group, wherein determining whether to perform the communication optimization process comprises:

in response to determining that the number of AP antennas is not greater than the number of antennas of a station (STA), determining not to perform the communication optimization process.

2. The method according to claim 1, wherein the first grouping standard set is selected from a grouping standard list, the grouping standard list including a grouping standard based on a physical location of the AP antennas, a grouping standard based on a radiation pattern of the AP antennas, and a grouping standard based on a polarization direction of the AP antennas.

3. The method according to claim 2, wherein the grouping standard based on the physical location of the AP antennas comprises:

dividing the AP antennas which are less than a first threshold distance apart into a same group.

4. The method according to claim 2, wherein the grouping standard based on the polarization direction of the AP antennas comprises:

dividing the AP antennas with a same polarization direction into a same group.

5. The method according to claim 2, wherein the grouping standard based on the radiation pattern of the AP antennas comprises:

dividing the AP antennas of which a similarity of radiation pattern is greater than a similarity threshold into a same group.

6. The method according to claim 1, wherein the communication performance comprises a throughput, and determining whether to perform the communication optimization process comprises:

recording the throughput of communication by the AP during a predetermined time period before determining whether to perform the communication optimization process;

comparing the recorded throughput of the AP with a predetermined throughput;

in response to the recorded throughput of the AP being lower than the predetermined throughput, determining to perform the communication optimization process.

7. The method according to claim 6, wherein the recorded throughput of the AP has a same number of space-time streams and a same signal-to-noise ratio (SNR) as the predetermined throughput.

8. The method according to claim 1, wherein dividing the AP antennas into the first number of AP antenna groups based on the first grouping standard set comprises:

selecting a first order from a plurality of orders of grouping standards in the first grouping standard set; and applying grouping standards in the first grouping standard set in the first order to divide AP antennas into the first number of the AP antenna groups.

9. The method according to claim 1, wherein selecting no more than one AP antenna in each AP antenna group as target AP antennas comprises:
   determining the average received signal strength indication RSSI of the AP antennas;
   comparing the RSSI of AP antennas in each AP antenna group with the average RSSI; and
   selecting the AP antenna with the RSSI with a largest deviation from the average RSSI from each AP antenna group for communication.

10. The method of claim 1, further comprising:
    performing an inter-group selection on the AP antennas selected in each AP antenna group;
    using the AP antennas based on the inter-group selection as the target AP antennas for communication;
    wherein, the inter-group selection includes selecting AP antennas which distance are more than a second distance threshold apart, from AP antennas selected in each AP antenna group.

11. The method of claim 1, further comprising:
    recording a throughput of the AP using the target AP antennas for communication for a predetermined period of time;
    comparing the recorded throughput of the target AP antennas with a predetermined throughput;
    in response to the recorded throughput of the target AP antennas being lower than the predetermined throughput, determining to perform the communication optimization process again;
    wherein the recorded throughput of the target AP antennas comprises the same number of space-time streams and the same signal-to-noise ratio (SNR) as the predetermined throughput.

12. The method according to claim 11, wherein performing the communication optimization process again comprises:
    dividing AP antennas into a second number of AP antenna groups based on a second grouping standard set, wherein the second number is not less than the number of STA antennas of the STA and is less than the number of the AP antennas; and
    selecting no more than one antenna in each AP antenna group as the target AP antennas.

13. The method according to claim 12, wherein,
    the first number is different from the second number;
    the grouping standards included in the first grouping standard set are different from the grouping standards included in the second grouping standard set; or
    the grouping standards included in the first grouping standard set are same as the grouping standards included in the second grouping standard set, and the order in which the grouping standards in the first grouping standard set are applied is different from the order in which the grouping standards in the second grouping standard set are applied.

14. The method of claim 12, further comprising:
    stopping an antenna selection in response to at least one of: the number of times of performing antenna selection being greater than a predetermined number, a RSSI change of the AP antennas being greater than a predetermined RSSI, and a SNR change of the AP antennas being greater than a predetermined SNR, wherein the predetermined number is determined based on the number of AP antennas and the number of STA antennas of the STA;
    using the AP antennas with the highest throughput during the selecting the target AP antennas for communication.

15. The method of claim 11, further comprising:
    in response to determining that the recorded throughput of the AP is not lower than a predetermined throughput, using the target antennas for communication.

16. The method according to claim 11, further comprising:
    determining whether to perform the communication optimization process again in response to the RSSI change of the AP antenna being greater than the predetermined RSSI or the SNR change of AP antennas being greater than the predetermined SNR during communication using the target antennas.

17. The method of claim 1, wherein the first number is not less than the number of STA antennas of a station (STA) communicating with the AP and the number of the target AP antennas is not less than the number of the STA antennas of the STA.

18. An access point (AP) comprising:
    a memory; and
    a processor coupled to the memory and configured to:
    determine whether to perform a communication optimization process based on a communication performance of the AP;
    in response to determining to perform the communication optimization process, divide AP antennas of the AP into a first number of AP antenna groups based on a first grouping standard set, wherein the first number is less than the number of the AP antennas of the AP; and
    select target AP antennas for communication, wherein no more than one target AP antenna is selected in each AP antenna group,
    wherein determining whether to perform the communication optimization process comprises:
    in response to determining that the number of AP antennas is not greater than the number of antennas of a station (STA), determining not to perform the communication optimization process.

19. A non-transitory computer readable medium having stored thereon instructions, in response to execution by a processor, the instructions are configured to cause the processor to:
    determine whether to perform a communication optimization process based on a communication performance of an access point (AP);
    in response to determining to perform the communication optimization process, divide AP antennas of the AP into a first number of AP antenna groups based on a first grouping standard set, wherein the first number is less than the number of the AP antennas of the AP; and
    select target AP antennas for communication, wherein no more than one target AP antenna is selected in each AP antenna group,
    wherein determining whether to perform the communication optimization process comprises:
    in response to determining that the number of AP antennas is not greater than the number of antennas of a station (STA), determining not to perform the communication optimization process.

* * * * *